United States Patent
Lattin

(10) Patent No.: US 9,927,161 B2
(45) Date of Patent: Mar. 27, 2018

(54) SUBCOOLING WITH A PRESSURE-REGULATING DEVICE IN A TRANSPORT REFRIGERATION SYSTEM

(71) Applicant: THERMO KING CORPORATION, Minneapolis, MN (US)

(72) Inventor: Robert Michael Lattin, Minneapolis, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 139 days.

(21) Appl. No.: 14/958,521

(22) Filed: Dec. 3, 2015

(65) Prior Publication Data

US 2016/0161164 A1 Jun. 9, 2016

Related U.S. Application Data

(60) Provisional application No. 62/086,896, filed on Dec. 3, 2014.

(51) Int. Cl.
| | |
|---|---|
| *F25B 49/02* | (2006.01) |
| *F25B 13/00* | (2006.01) |
| *F25B 40/02* | (2006.01) |
| *B60H 1/32* | (2006.01) |

(52) U.S. Cl.
CPC ......... *F25B 49/022* (2013.01); *B60H 1/3202* (2013.01); *B60H 1/3204* (2013.01); *B60H 1/3227* (2013.01); *F25B 40/02* (2013.01); *B60H 2001/3289* (2013.01); *F25B 2341/0662* (2013.01); *F25B 2400/05* (2013.01)

(58) Field of Classification Search
CPC .......... F25B 49/02; F25B 13/00; F25B 40/02; F25B 49/022; F25B 2341/0662; F25B 2400/05; B60H 1/2302; B60H 1/3204; B60H 1/3227; B60H 2001/3289
USPC ................................................. 62/115, 228.3
See application file for complete search history.

(56) References Cited

U.S. PATENT DOCUMENTS

| | | | | |
|---|---|---|---|---|
| 3,783,849 A | * | 1/1974 | Bramfitt | ................. F02M 13/06 123/179.16 |
| 4,217,764 A | * | 8/1980 | Armbruster | .......... B60H 1/3226 62/239 |
| 2013/0298593 A1 | * | 11/2013 | Christensen | ............ F25B 9/008 62/467 |

* cited by examiner

*Primary Examiner* — Mohammad M Ali
(74) *Attorney, Agent, or Firm* — Hamre, Schumann, Mueller & Larson, P.C.

(57) ABSTRACT

A transport refrigeration system (TRS) and method of subcooling a heat transfer fluid in a heat transfer circuit of a TRS are disclosed. The TRS includes a heat transfer circuit. The heat transfer circuit includes a compressor, a condenser, an expansion device, and an evaporator. The compressor, the condenser, the expansion device, and the evaporator are in fluid communication such that a heat transfer fluid can flow therethrough. The heat transfer circuit is configured to be in thermal communication with a pressure-regulating device of a system separate from the heat transfer circuit.

18 Claims, 3 Drawing Sheets

SUBCOOLING WITH A PRESSURE-REGULATING DEVICE IN A TRANSPORT REFRIGERATION SYSTEM

FIELD

This disclosure relates generally to a transport refrigeration system (TRS). More specifically, the disclosure relates to a system for subcooling a heat transfer fluid in a heat transfer circuit of the TRS using a pressure-regulating device.

BACKGROUND

A transport refrigeration system (TRS) is generally used to control one or more environmental conditions such as, but not limited to, temperature and/or humidity of a refrigerated transport unit. Examples of refrigerated transport units include, but are not limited to, a container on a flat car, an intermodal container, a truck, a boxcar, or other similar transport units. A refrigerated transport unit is commonly used to transport perishable items such as produce, frozen foods, and meat products. Generally, the refrigerated transport unit includes a transport unit and a transport refrigeration unit (TRU) that is attached to the transport unit to control one or more environmental conditions (e.g., temperature, humidity, etc.) of a particular space (e.g., a cargo space, a passenger space, etc.) (generally referred to as a "conditioned space"). The TRU can include, without limitation, a compressor, a condenser, an expansion valve, an evaporator, and fans or blowers to control the heat exchange between the air inside the conditioned space and the ambient air outside of the refrigerated transport unit.

SUMMARY

This disclosure relates generally to a transport refrigeration system (TRS). More specifically, the disclosure relates to a system for subcooling a heat transfer fluid in a heat transfer circuit of the TRS using a pressure-regulating device.

In some embodiments, an internal combustion engine can provide mechanical power to a vehicle of a refrigerated transport unit. In other embodiments, the internal combustion engine can provide mechanical power directly to a component (e.g., a compressor) of the TRS.

In some embodiments, a heat transfer circuit can be disposed in thermal communication with a pressure-regulating device of a fuel system. In such embodiments, the heat transfer circuit can reject heat to the pressure-regulating device thereby heating the fuel. In some embodiments, rejecting heat to the pressure-regulating device and heating the fuel can prevent the fuel from gelling. In some embodiments, rejecting heat to the pressure-regulating device can subcool the heat transfer fluid in the heat transfer circuit.

In some embodiments, a fluid use device is in fluid communication with a pressurized tank. The fluid use device can use fluid from the pressurized tank. Examples of the fluid use device include, but are not limited to, an internal combustion engine; a compressed air device (e.g., air-actuated brakes, air-controlled suspension, air-motor, or the like); a fuel-cell powered refrigeration system (e.g., having a compressed hydrogen fuel source); a natural gas/propane burner supplying heat for a sorption system in a refrigeration system; or the like, including suitable combinations thereof. Fluids can be stored under pressure in the pressurized tank. Examples of such fluids include, but are not limited to, compressed air, compressed hydrogen, compressed natural gas (e.g., propane), liquid natural gas, liquid nitrogen, or the like.

In some embodiments, a heat transfer circuit can be disposed in thermal communication with a pressure-regulating device of a fluid use system. In such embodiments, the heat transfer circuit can reject heat to the pressure-regulating device thereby heating the fluid. In some embodiments, rejecting heat to the pressure-regulating device and heating the fluid can prevent the fluid or contaminants therein from obstructing flow through the pressure-regulating device. In some embodiments, rejecting heat to the pressure-regulating device can subcool the heat transfer fluid in the heat transfer circuit.

In some embodiments, subcooling the heat transfer fluid can increase an efficiency of the heat transfer circuit. In some embodiments, increasing the efficiency of the heat transfer circuit can reduce an amount of runtime for an engine. In some embodiments, reducing an amount of runtime for the engine can increase a fuel efficiency of the engine.

A TRS is disclosed. The TRS includes a heat transfer circuit. The heat transfer circuit includes a compressor, a condenser, an expansion device, and an evaporator. The compressor, the condenser, the expansion device, and the evaporator are in fluid communication such that a heat transfer fluid can flow therethrough. The heat transfer circuit is configured to be in thermal communication with a pressure-regulating device of a system separate from the heat transfer circuit.

A TRS is disclosed. The TRS includes The TRS includes a heat transfer circuit. The heat transfer circuit includes a compressor, a condenser, an expansion device, and an evaporator. The TRS also includes an internal combustion engine. The internal combustion engine is in fluid communication with a fuel tank and a pressure-regulating device. The pressure-regulating device is configured to control a pressure of a fuel. The pressure-regulating device and the heat transfer circuit are in thermal communication.

A method of subcooling a heat transfer fluid in a heat transfer circuit of a TRS is disclosed. The method includes directing the heat transfer fluid through the heat transfer circuit. The heat transfer circuit is in thermal communication with a pressure-regulating device of an engine system such that the heat transfer fluid rejects heat to the pressure-regulating device.

A system is disclosed. The system includes an internal combustion engine, a fuel tank, and a pressure-regulating device. The pressure-regulating device is configured to control a pressure of a fuel for the internal combustion engine. The internal combustion engine is in fluid communication with the fuel tank and the pressure-regulating device. The pressure-regulating device is configured to be in thermal communication with a heat transfer circuit of a TRS.

A system is disclosed. The system includes a fluid use device; a pressurized tank; and a pressure-regulating device. The pressure-regulating device is configured to control a pressure of a fluid for the fluid use device. The fluid use device is in fluid communication with the pressurized tank and the pressure-regulating device, and wherein the pressure-regulating device is configured to be in thermal communication with a heat transfer circuit of a transport refrigeration system (TRS).

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

Figure 1:
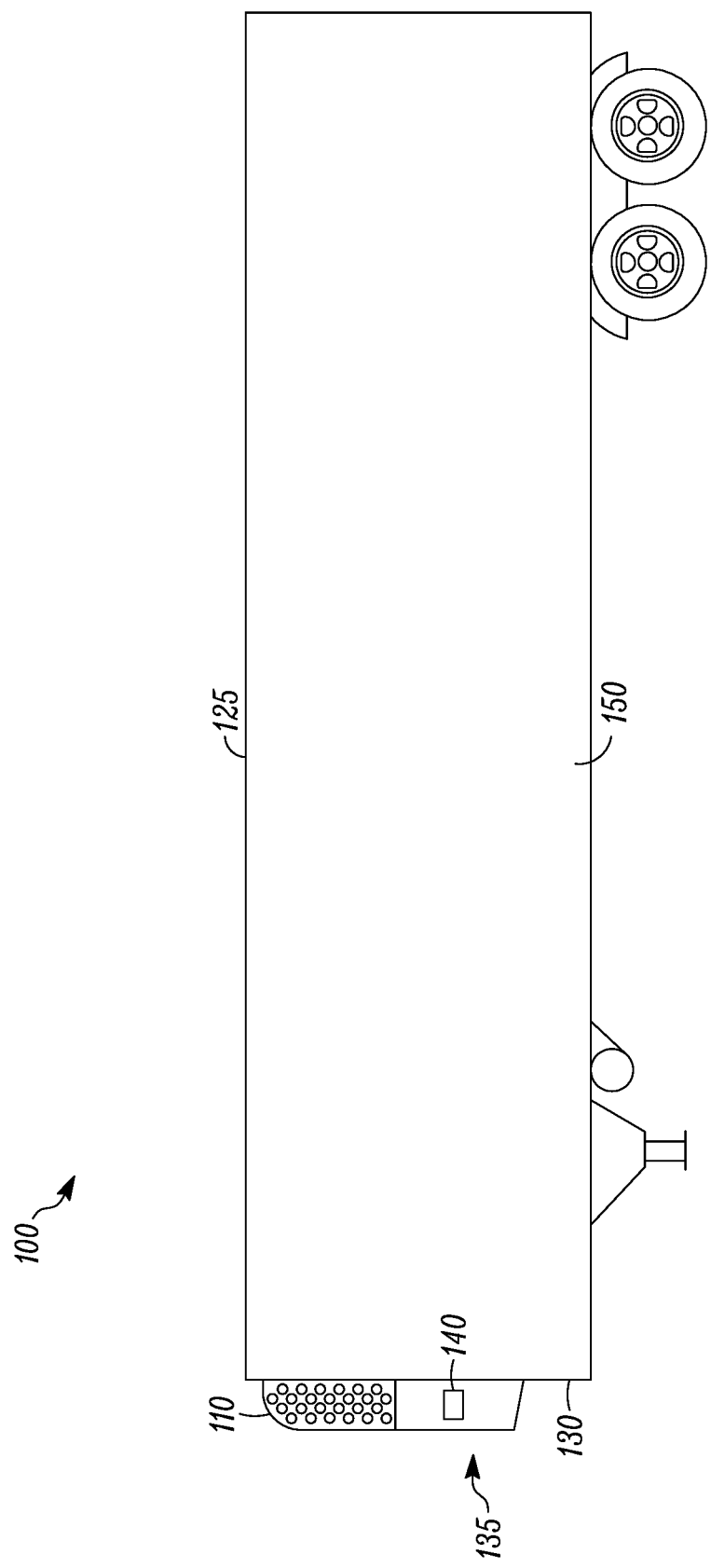
FIG. 1 illustrates a side view of a refrigerated transport unit, according to some embodiments.

This disclosure relates generally to a transport refrigeration system (TRS). More specifically, the disclosure relates to a system for subcooling a heat transfer fluid in a heat transfer circuit of the TRS using a pressure-regulating device.

Some devices use fluids that are stored at relatively high pressures, but require a conversion of the fluid from the relatively high pressure to a relatively low pressure. For example, some internal combustion engines use fuel that is stored in a fuel tank at a relatively high pressure. In some cases, the pressure can be, for example, 3600 pounds per square inch (psi) or greater. Conversely, the internal combustion engines themselves operate with fuel at a relatively low pressure. In some cases, the pressure can be, for example, 150 psi or lower. For such internal combustion engines, a pressure-regulating device (e.g., a fuel pressure regulator) is used to reduce the stored fuel pressure from the relatively higher pressure to the relatively lower pressure of the engine. During the fuel expansion, the temperature of the fuel drops as a function of the pressure difference. Accordingly, the amount of cooling is proportional to the temperature drop and the mass of the fuel passing through the pressure-regulating device. The cooling of the fuel can cause contaminants and/or additives (e.g., compressor oil, water vapor, etc.) to freeze or clog the pressure-regulating device.

In some embodiments, the pressure-regulating device, and therefore fuel passing therethrough, can be heated by an external device. For example, in some embodiments the pressure-regulating device can be heated by an electric resistance-heating element that is routed through a base of the pressure-regulating device. In some embodiments, an engine coolant circuit can be routed through the base of the pressure-regulating device. In either case, heat is provided to the pressure-regulating device to attempt prevention of freezing and/or clogging of the pressure-regulating device.

Embodiments described herein include providing a portion of a heat transfer circuit in thermal communication with the pressure-regulating device. In such embodiments, the heat transfer circuit includes a heat transfer fluid passing therethrough. The heat transfer fluid can reject heat to the pressure-regulating device to prevent freezing and/or clogging of the pressure-regulating device. By rejecting heat to the pressure-regulating device, the fuel is also heated and the heat transfer fluid is subcooled. This subcooling can take place between a condenser and an expansion device of the heat transfer circuit. Subcooling the heat transfer fluid can increase the efficiency and the capacity of the refrigeration system (e.g., a TRS) of which the heat transfer circuit is a part.

A TRS is generally used to control one or more environmental conditions such as, but not limited to, temperature, humidity, and/or air quality of a refrigerated transport unit. Examples of refrigerated transport units include, but are not limited to, a container on a flat car, an intermodal container, a truck, a boxcar, or other similar transport units. A refrigerated transport unit can be used to transport perishable items such as, but not limited to, produce, frozen foods, and meat products.

As disclosed in this specification, a TRS can include a transport refrigeration unit (TRU) which is attached to a transport unit to control one or more environmental conditions (e.g., temperature, humidity, air quality, etc.) of an interior space of the refrigerated transport unit. The TRU can include, without limitation, a compressor, a condenser, an expansion valve, an evaporator, and one or more fans or blowers to control the heat exchange between the air within the interior space and the ambient air outside of the refrigerated transport unit.

A "transport unit" includes, for example, a container on a flat car, an intermodal container, truck, a boxcar, or other similar transport unit.

A "transport refrigeration system" (TRS) includes, for example, a refrigeration system for controlling the refrigeration of an interior space of a refrigerated transport unit. The TRS may be a vapor-compressor type refrigeration system, a thermal accumulator type system, or any other suitable refrigeration system that can use refrigerant, cold plate technology, or the like.

A "refrigerated transport unit" includes, for example, a transport unit having a TRS.

A "fuel" includes, for example, any fluid suitable for combustion by an internal combustion engine. A fuel can be used in a liquid form or a gaseous form. Examples of fuels include, but are not limited to, natural gas, propane, hydrogen, liquid nitrogen, or the like.

A "pressurized tank" includes, for example, a tank configured to store a fluid under pressure. The pressurized tank can store a fluid in the form of a liquid or a gas. Examples of fluids which can be stored in the pressurized tank include, but are not limited to, compressed air, compressed hydrogen, compressed natural gas (e.g., propane), liquid natural gas, liquid nitrogen, or the like.

A "fluid use device" includes, for example, any device using a fluid stored in a pressurized tank that is reduced in pressure via a pressure-regulating device. Examples of fluid use devices include, but are not limited to, an internal combustion engine; a compressed air device (e.g., air-actuated brakes, air-controlled suspension, air-motor, or the like); a fuel-cell powered refrigeration system (e.g., having a compressed hydrogen fuel source); a natural gas/propane burner supplying heat for a sorption system in a refrigeration system; or the like, including suitable combinations thereof.

Embodiments of this disclosure may be used in any suitable environmentally controlled transport apparatus, such as, but not limited to, an over the road truck cabin, an HVAC system for a bus, a hydrogen-powered fuel cell, a heat-powered refrigeration system where pressurized fuel is used as a heat source, or the like.

FIG. 1 illustrates a side view of a TRS 100 for a transport unit 125, according to some embodiments. The illustrated transport unit 125 is a trailer-type transport unit. Embodiments as described in this specification can be used with other types of transport units. For example, the transport unit 125 can represent a container (e.g., a container on a flat car, an intermodal container, etc.), a truck, a boxcar, or other similar type of refrigerated transport unit including an environmentally controlled interior space.

The TRS 100 is configured to control one or more environmental conditions such as, but not limited to, temperature, humidity, and/or air quality of an interior space 150 of the transport unit 125. In some embodiments, the interior space 150 can alternatively be referred to as the conditioned space 150, the cargo space 150, the environmentally controlled space 150, or the like. In particular, the TRS 100 is configured to transfer heat between the air inside the interior space 150 and the ambient air outside of the transport unit 125.

The interior space 150 can include one or more partitions or internal walls (not shown) for at least partially dividing the interior space 150 into a plurality of zones or compartments, according to some embodiments. It is to be appreciated that the interior space 150 may be divided into any number of zones and in any configuration that is suitable for refrigeration of the different zones. In some examples, each of the zones can have a set point temperature that is the same or different from one another.

The TRS 100 includes a transport refrigeration unit (TRU) 110. The TRU 110 is provided on a front wall 130 of the transport unit 125. The TRU 110 can include an internal combustion engine (as shown and described in accordance with FIGS. 2-3 below) that provides mechanical power directly to a component (e.g., a compressor, etc.) of the TRS 100. In some embodiments, the engine of the TRU 110 can provide power directly to an alternator (not shown), which can be used to power the component. In such embodiments, the TRU 110 can include an electric drive motor that provides mechanical power directly to the component (e.g., a compressor, etc.) of the TRS 100.

The TRU 110 includes a programmable TRS Controller 135 that includes a single integrated control unit 140. It will be appreciated that in other embodiments, the TRS Controller 135 may include a distributed network of TRS control elements (not shown). The number of distributed control elements in a given network can depend upon the particular application of the principles described in this specification. The TRS Controller 135 can include a processor, a memory, a clock, and an input/output (I/O) interface (not shown). The TRS Controller 135 can include fewer or additional components.

The TRU 110 also includes a closed refrigeration circuit (not shown in FIG. 1). Generally, the TRS Controller 135 is configured to control a heat transfer cycle (e.g., controlling the closed refrigeration circuit of the TRU 110) of the TRS 100. In one example, the TRS Controller 135 controls the heat transfer cycle of the TRS 100 to obtain various operating conditions (e.g., temperature, humidity, air quality, etc.) of the interior space 150.

Figure 2:
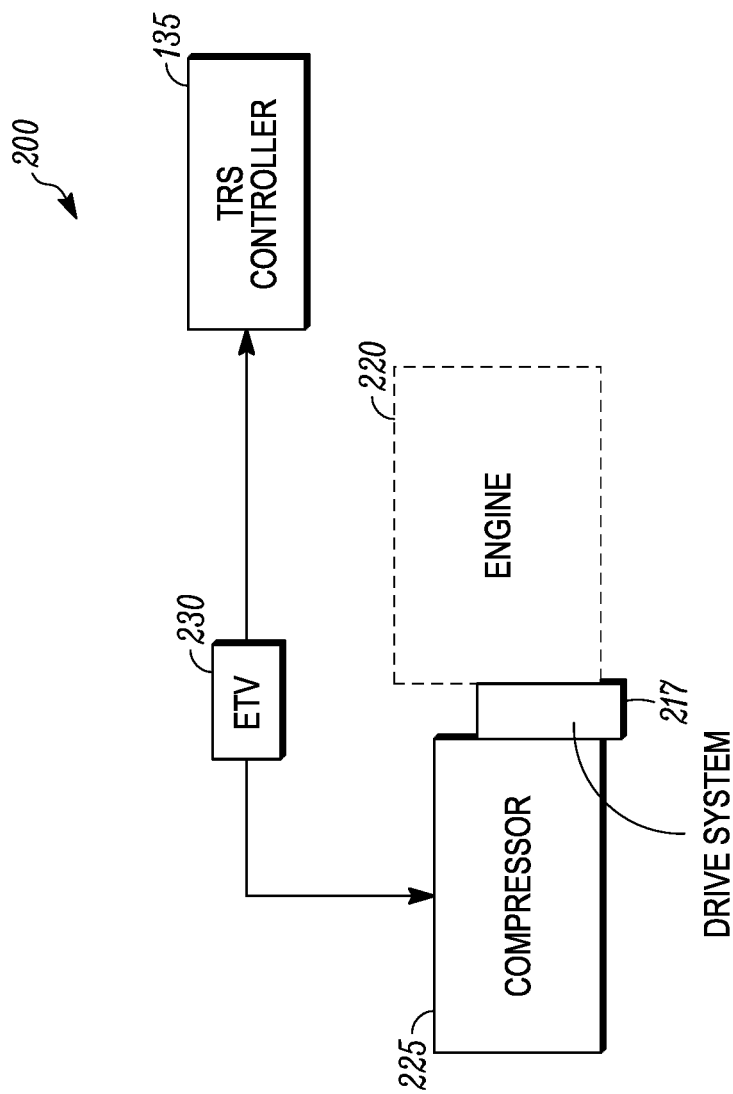
FIG. 2 illustrates a schematic diagram of a portion of a transport refrigeration system (TRS), according to some embodiments.
Figure 3:
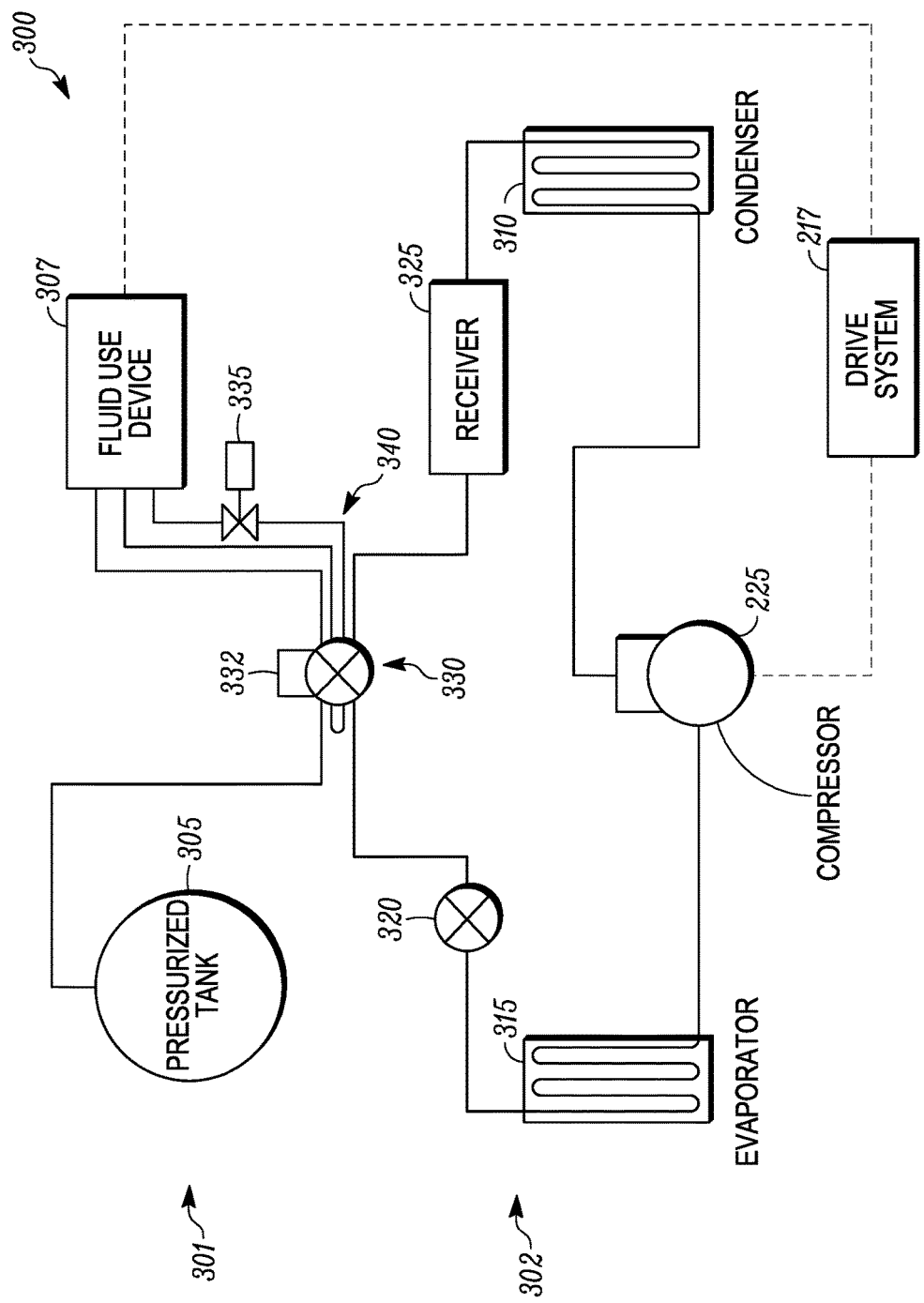
FIG. 3 illustrates a schematic diagram of a TRS, according to some embodiments.

The TRS 100 includes an internal combustion engine, according to some embodiments (e.g., an internal combustion engine 220 shown in FIGS. 2-3). In some embodiments, the internal combustion engine can generally include a cooling system (e.g., water or liquid coolant system), an oil lubrication system, and an electrical system. An air filtration system can filter air directed into a combustion chamber of the internal combustion engine. In some embodiments, the internal combustion engine is not specifically configured for the TRS 100, but can be a non-industrial internal combustion engine, such as an automotive internal combustion engine.

FIG. 2 illustrates a schematic diagram of a portion 200 of the TRS 100 (FIG. 1), according to some embodiments. The TRS 100 can generally be configured to maintain an environmental condition in the conditioned space 150 (FIG. 1). In some embodiments, the TRS 100 can be configured to heat the conditioned space 150. In some embodiments, the TRS 100 can be configured to cool the conditioned space 150.

The TRS 100 includes the TRS Controller 135, an engine 220 (e.g., an internal combustion engine), a drive system 217, and a compressor 225. The TRS 100 can include one or more additional components. For example, the TRS 100 includes an electronic throttling valve (ETV) 230 to control a volume of a heat transfer fluid injected into the compressor 225.

The engine 220 can be configured to provide mechanical power directly to a component (e.g., a compressor, etc.) of the TRS 100. In some embodiments, the engine 220 can be coupled to the component (e.g., the compressor 225) via the drive system 217. The drive system 217 can be, for example, a belt (not shown), a chain (not shown), or the like, such that the speed of the component (e.g., the compressor 225) is proportional to the speed of the engine 220.

In some embodiments, the engine 220 can, for example, drive a generator (not shown) or an alternator (not shown) that provides power to, for example, an electric drive motor (not shown). In such embodiments, the electric drive motor provides mechanical power to the component (e.g., the compressor 225) instead of the engine 220. In some embodiments, the TRS 100 can include both the engine 220 and an electric drive motor. In such embodiments, the drive system 217 can be configured such that it is engageable by either the engine 220 or the electric drive motor in order to drive the component (e.g., the compressor 225).

The engine 220 can, for example, be an internal combustion engine. The fuel can be, for example, natural gas (e.g., propane or the like), hydrogen, or other fuels stored under pressure and suitable for combustion by an internal combustion engine. The operation of the engine 220 may be dependent on an operating mode of the TRS 100. For example, the engine 220 can be a two-speed engine configured to operate at a low engine speed or a high engine speed. In some embodiments, the engine 220 may be variable speed and capable of operating at multiple speeds. The specifications of the engine 220 can be dependent on the manufacturer and product variations.

The compressor 225 represents any type of compressor suitable for use in a TRS. For example, the compressor 225 can be a digital scroll compressor, a reciprocating compressor, a screw compressor, a positive displacement compressor, a centrifugal compressor, or other suitable type of compressor.

FIG. 3 illustrates a schematic diagram of another portion 300 of the TRS 100 (FIG. 1), according to some embodiments. FIG. 3 generally includes a fluid use system 301 and a heat transfer circuit 302. In some embodiments the fluid use system 301 can include an internal combustion engine that is configured to provide mechanical power directly to a component of the heat transfer circuit 302 (e.g., the compressor 225). In such embodiments, the drive system 217 can couple the engine 220 and the compressor 225. In some embodiments, the fluid use system 301 can including an internal combustion engine configured to, for example, provide mechanical power to a transport vehicle (e.g., for pulling the refrigerated transport unit 125 of FIG. 1). In such embodiments, the drive system 217 may be coupled to an electric drive motor or an engine (not shown) other than engine 220. In the illustrated embodiment, the fluid use system 301 is an engine system including a pressurized fuel tank (e.g., pressurized tank 305) and an internal combustion engine (e.g., fluid use device 307).

The fluid use system 301 includes the pressurized tank 305, the fluid use device 307, and a pressure-regulating device 330. Fluids can be stored under pressure in the pressurized tank 305. Examples of such fluids include, but are not limited to, compressed air, compressed hydrogen, compressed natural gas (e.g., propane), liquid natural gas, liquid nitrogen, or the like. The fluid use device 307 includes, for example, any device using a fluid stored in the pressurized tank 305 that is reduced in pressure via pressure-regulating device 330. Examples of fluid use devices include, but are not limited to, an internal combustion engine; a compressed air device (e.g., air-actuated brakes, air-controlled suspension, air-motor, or the like); a fuel-cell powered refrigeration system (e.g., having a compressed hydrogen fuel source); a natural gas/propane burner supplying heat for a sorption system in a refrigeration system; or the like, including suitable combinations thereof.

The pressure-regulating device 330 is disposed between the pressurized tank 305 and the fluid use device 307. In some embodiments, the pressure-regulating device 330 can alternatively be referred to as the expansion device 330, the fluid pressure regulator 330, or the fluid pressure-regulating device 330. The pressure-regulating device 330 is generally used to change the pressure of fluid flowing from the pressurized tank 305 to the fluid use device 307. In some embodiments, the pressure-regulating device 330 can reduce the pressure of the fluid coming from the pressurized tank 305. In some embodiments, the fluid coming from the pressurized tank 305 can be at a variable pressure and the pressure-regulating device 330 can regulate an output pressure of the fluid to be substantially constant.

In order to provide adequate heating to the pressure-regulating device 330 and the fluid passing therethrough, a passage (not shown) can be formed in or near the pressure-regulating device 330. The passage can be used to permit the heat transfer fluid from the heat transfer circuit 302 to be routed therethrough. Accordingly, the heat transfer fluid can transfer heat to/from the incoming fluid. Transferring heat to/from the incoming fluid can provide increased performance of the fluid use device 307 by reducing, for example, blockages in the pressure-regulating device 330 or the fluid line(s) between the pressurized tank 305 and the fluid use device 307.

The heat transfer circuit 302 is configured to regulate one or more operating conditions (e.g., temperature, humidity, etc.) of the interior space 150. The heat transfer circuit 302 includes the compressor 225, a condenser 310, a receiver 325, an expansion device 320, and an evaporator 315. The heat transfer circuit 302 can include fewer or additional components, according to some embodiments. Together, the components of the heat transfer circuit 302 can heat or cool the interior space 150 and anything contained therein (e.g., people, cargo, sensitive products, etc.).

By transferring heat to/from the heat transfer fluid to the incoming fluid, the heat transfer fluid may be subcooled as it leaves the condenser, prior to reaching the expansion device 320. Subcooling the heat transfer fluid can, in some embodiments, increase the efficiency of the heat transfer circuit 302. In some embodiments, the increase in subcooling of the heat transfer fluid can increase the capacity performance of the TRS 100.

In some embodiments, the fluid use device 307 also includes a coolant system 340. In such embodiments, the coolant system can 340 can be in thermal communication with the pressure-regulating device in order to transfer heat between the incoming fluid and the coolant. The coolant system 340 can include a flow control device 335 (e.g., a solenoid valve or the like) in order to control the amount of coolant flowing toward the pressure-regulating device 330.

In some embodiments, the pressure-regulating device 330 can be in thermal communication with a heating element 332 (e.g., an electric resistance-heating element or the like).

In such embodiments, the heating element 332 can be used to transfer heat between the incoming fluid as well.

It is to be appreciated that the heat transfer circuit 302, the heating element 332, and the coolant system 340 can be used at or about the same time in order to transfer heat to/from the pressure-regulating device 330. In some embodiments, the heating element 332 and/or the coolant system 340 can be selectively enabled if the heat transfer circuit 302 is unable to transfer sufficient heat to the pressure-regulating device in order to prevent and/or reduce gelling of the fluid.

Aspects:

It is noted that any of aspects 1-4 below can be combined with any of aspects 5-10, 11-13, 14-18, or 19-23. Any of aspects 5-10 can be combined with any of aspects 11-13, 14-18, or 19-23. Further, any of aspects 11-13 can be combined with any of aspects 14-18 or 19-23 and any of aspects 14-18 can be combined with any of aspects 19-23.

Aspect 1. A transport refrigeration system (TRS), comprising:
a heat transfer circuit, the heat transfer circuit including:
a compressor, a condenser, an expansion device, and an evaporator;
wherein the compressor, the condenser, the expansion device, and the evaporator are in fluid communication such that a heat transfer fluid can flow therethrough, and
the heat transfer circuit is configured to be in thermal communication with a pressure-regulating device of a system separate from the heat transfer circuit.

Aspect 2. The TRS according to aspect 1, wherein the system is an engine system.

Aspect 3. The TRS according to aspect 2, wherein the engine system is configured to provide mechanical power to the compressor of the heat transfer circuit.

Aspect 4. The TRS according to any of aspects 1-3, wherein the thermal communication with the pressure-regulating device is configured to be disposed at a location in the heat transfer circuit between the condenser and the expansion device.

Aspect 5. A transport refrigeration system (TRS), comprising:
a heat transfer circuit, the heat transfer circuit including:
a compressor, a condenser, an expansion device, and an evaporator; and
an internal combustion engine, the internal combustion engine in fluid communication with a fuel tank and a pressure-regulating device, the pressure-regulating device configured to control a pressure of a fuel,
wherein the pressure-regulating device and the heat transfer circuit are in thermal communication.

Aspect 6. The TRS according to aspect 5, further comprising an electric resistance-heater in thermal communication with the pressure-regulating device to modify a temperature of the fuel.

Aspect 7. The TRS according to any of aspects 5-6, further comprising an engine coolant circuit in thermal communication with the pressure-regulating device to modify a temperature of the fuel.

Aspect 8. The TRS according to any of aspects 5-7, wherein the pressure-regulating device is disposed between the condenser and the expansion device.

Aspect 9. The TRS according to aspect 8, further comprising a heat transfer fluid receiver, wherein the receiver is disposed between the condenser and the pressure-regulating device.

Aspect 10. The TRS according to any of aspects 5-9, wherein the internal combustion engine is coupled to the compressor such that mechanical power is provided by the internal combustion engine to the compressor.

Aspect 11. A method of subcooling a heat transfer fluid in a heat transfer circuit of a transport refrigeration system (TRS), comprising:
  directing the heat transfer fluid through the heat transfer circuit, wherein the heat transfer circuit is in thermal communication with a pressure-regulating device of an engine system such that the heat transfer fluid rejects heat to the pressure-regulating device.

Aspect 12. The method according to aspect 11, further comprising:
  directing a fuel from a fuel tank in the engine system to an internal combustion engine of the engine system.

Aspect 13. The method according to aspect 12, further comprising:
  heating the fuel from the fuel tank as it flows through the pressure-regulating device to the internal combustion engine.

Aspect 14. A system, comprising:
  an internal combustion engine;
  a fuel tank; and
  a pressure-regulating device, the pressure-regulating device configured to control a pressure of a fuel for the internal combustion engine,
  wherein the internal combustion engine is in fluid communication with the fuel tank and the pressure-regulating device, and wherein the pressure-regulating device is configured to be in thermal communication with a heat transfer circuit of a transport refrigeration system (TRS).

Aspect 15. The system according to aspect 14, wherein the system is configured to provide mechanical power to a component of the TRS.

Aspect 16. The system according to any of aspects 14-15, further comprising:
  an electric resistance-heater in thermal communication with the pressure-regulating device to modify a temperature of the fuel.

Aspect 17. The system according to any of aspects 14-16, further comprising:
  an engine coolant circuit in thermal communication with the pressure-regulating device to modify a temperature of the fuel.

Aspect 18. The system according to any of aspects 14-17, wherein the system is configured to provide mechanical power to a vehicle.

Aspect 19. A system, comprising:
  a fluid use device;
  a pressurized tank; and
  a pressure-regulating device, the pressure-regulating device configured to control a pressure of a fluid for the fluid use device,
  wherein the fluid use device is in fluid communication with the pressurized tank and the pressure-regulating device, and wherein the pressure-regulating device is configured to be in thermal communication with a heat transfer circuit of a transport refrigeration system (TRS).

Aspect 20. The system according to aspect 19, wherein the fluid use device is one or more of an internal combustion engine; a compressed air device; a fuel cell powered refrigeration system; a natural gas burner supplying heat for a sorption system in a refrigeration system; and a propane burner supplying heat for a sorption system in a refrigeration system or the like.

Aspect 21. The system according to any of aspects 19-20, further comprising:
  an electric resistance-heater in thermal communication with the pressure-regulating device to modify a temperature of the fluid.

Aspect 22. The system according to any of aspects 19-21, further comprising:
  a coolant circuit in thermal communication with the pressure-regulating device to modify a temperature of the fluid.

Aspect 23. The system according to any of aspects 19-22, wherein the system is configured to provide mechanical power to a vehicle.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

What is claimed is:
1. A transport refrigeration system (TRS), comprising:
  a heat transfer circuit, the heat transfer circuit including:
    a compressor, a condenser, an expansion device, and an evaporator fluidly connected in a closed loop such that a heat transfer fluid can flow therethrough; and
  an engine system fluidly separated from the heat transfer circuit, the engine system including a pressure-regulating device, the engine system being configured to provide mechanical power to the compressor,
  wherein the heat transfer circuit is in thermal communication with the engine system via the pressure-regulating device.

2. The TRS according to claim 1, wherein the thermal communication with the pressure-regulating device is configured to be disposed at a location in the heat transfer circuit between the condenser and the expansion device.

3. The TRS according to claim 1, wherein the engine system includes:
  an internal combustion engine, the internal combustion engine in fluid communication with a fuel tank and the pressure-regulating device, the pressure-regulating device configured to control a pressure of a fuel.

4. The TRS according to claim 3, further comprising an electric resistance-heater in thermal communication with the pressure-regulating device to modify a temperature of the fuel.

5. The TRS according to claim 3, further comprising an engine coolant circuit in thermal communication with the pressure-regulating device to modify a temperature of the fuel.

6. The TRS according to claim 3, wherein the pressure-regulating device is disposed between the condenser and the expansion device.

7. The TRS according to claim 6, further comprising a heat transfer fluid receiver, wherein the receiver is disposed between the condenser and the pressure-regulating device.

8. A method of subcooling a heat transfer fluid in a heat transfer circuit of a transport refrigeration system (TRS), the heat transfer circuit including a compressor, a condenser, an expansion device, and an evaporator fluidly connected in a closed loop such that the heat transfer fluid can flow therethrough, the method comprising:
directing the heat transfer fluid through the heat transfer circuit, the heat transfer circuit being in thermal communication with a pressure-regulating device of an engine system, wherein the heat transfer circuit is fluidly separate from the engine system, the engine system being configured to provide mechanical power to the compressor of the heat transfer circuit; and
rejecting heat from the heat transfer fluid to the pressure-regulating device of the engine system.

9. The method according to claim 8, further comprising:
directing a fuel from a fuel tank in the engine system to an internal combustion engine of the engine system.

10. The method according to claim 9, further comprising:
heating the fuel from the fuel tank as it flows through the pressure-regulating device to the internal combustion engine.

11. The method according to claim 10, wherein the heating the fuel from the fuel tank as it flows through the pressure-regulating device to the internal combustion engine includes rejecting heat from the heat transfer circuit to the fuel via the thermal communication between the heat transfer circuit and the pressure-regulating device of the engine system.

12. A system, comprising:
a fluid use device;
a pressurized tank; and
a pressure-regulating device, the pressure-regulating device configured to control a pressure of a fluid for the fluid use device,
wherein the fluid use device is in fluid communication with the pressurized tank and the pressure-regulating device, and wherein the pressure-regulating device is configured to be fluidly separated but in thermal communication with a heat transfer circuit of a transport refrigeration system (TRS).

13. The system according to claim 12, wherein the fluid use device is one or more of an internal combustion engine; a compressed air device; a fuel-cell powered refrigeration system; a natural gas burner supplying heat for a sorption system in a refrigeration system; and a propane burner supplying heat for a sorption system in a refrigeration system.

14. The system according to claim 12, further comprising:
an electric resistance-heater in thermal communication with the pressure-regulating device to modify a temperature of the fluid.

15. The system according to claim 12, further comprising:
a coolant circuit in thermal communication with the pressure-regulating device to modify a temperature of the fluid.

16. The system according to claim 12, wherein the system is configured to provide mechanical power to a vehicle.

17. The system according to claim 12, wherein the system is configured to provide mechanical power to a component of the TRS.

18. The system according to claim 12, wherein the fluid use device is an internal combustion engine, the pressurized tank is a fuel tank, and the fluid is a fuel for the internal combustion engine.

* * * * *